J. F. FAUST.
Horse Hay Rake.
No. 20,844.
Patented July 6, 1858.
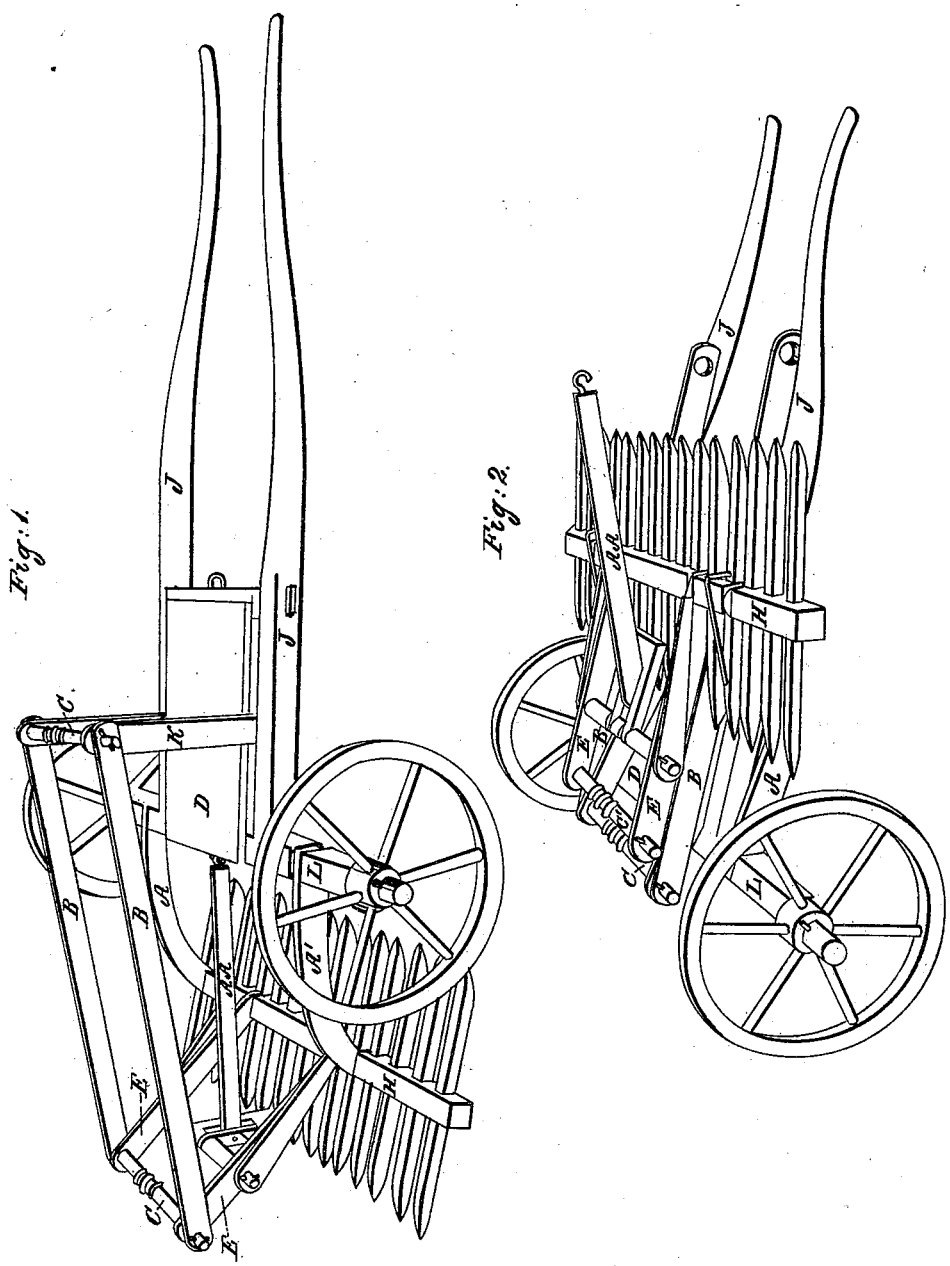

UNITED STATES PATENT OFFICE.

JOHN F. FAUST, OF LEBANON, OHIO, ASSIGNOR TO HIMSELF AND RICH. M. ROSS, OF PHILADELPHIA, PENNSYLVANIA.

IMPROVEMENT IN HORSE HAY-RAKES.

Specification forming part of Letters Patent No. 20,844, dated July 6, 1858.

*To all whom it may concern:*

Be it known that I, JOHN F. FAUST, of Lebanon, county of Warren, and State of Ohio, have made a new and useful Improvement in Revolving Horse-Rakes; and I do hereby declare that the following is a full, clear, and exact description thereof, reference being had to the accompanying drawings, and to the letters of reference marked thereon and made to form part of this specification.

Similar letters refer to like parts of the improvement.

The nature of the improvement consists in the combined arrangement of the parts with which the revolving rake is actuated when being operated, as hereinafter described.

To enable others skilled in the art to make and use the improvement, I will proceed to describe its construction and operation by referring direct to the accompanying drawings.

Figure 1 is a perspective view of the rake in a working position, and Fig. 2 is a perspective view of the raking apparatus folded for transportation.

A' A' represent arms attached to the axle L of the carriage, so that they will revolve, and the said arms carry the revolving rake H, as represented, which is raised and lowered and placed in a proper position for raking by means of the rods B and arms E and K. By taking hold of the cross-piece C, that connects the two upright pieces k together, and shoving them forward, any position can be given to the rake-teeth required for raking; or the rake can be elevated sufficiently to cause it to revolve, which is required when the rake has filled itself with hay or other substances being raked, for discharging.

A A is a guide-piece attached to the axle of the carriage and frame-pieces E E, as represented, for regulating the motion of the rake in its up and down movements.

D represents the platform of the carriage, for the operator to stand on, and J J the shafts of the carriage.

What I claim as my improvement, and desire to secure by Letters Patent, is—

The combined arrangement of the arms A' A', rods B B, arms E E and K K, and guide-rod A A, as constructed and arranged with the rake H and carriage, as represented, for operating the rake in the manner and for the purposes mentioned in the foregoing specification.

JOHN F. FAUST.

Witnesses:
I. C. SABIN,
THOMAS R. ROSS.